E. H. DEWSON.
ELECTROPNEUMATIC BRAKE VALVE.
APPLICATION FILED OCT. 9, 1908.
1,108,149.
Patented Aug. 25, 1914.
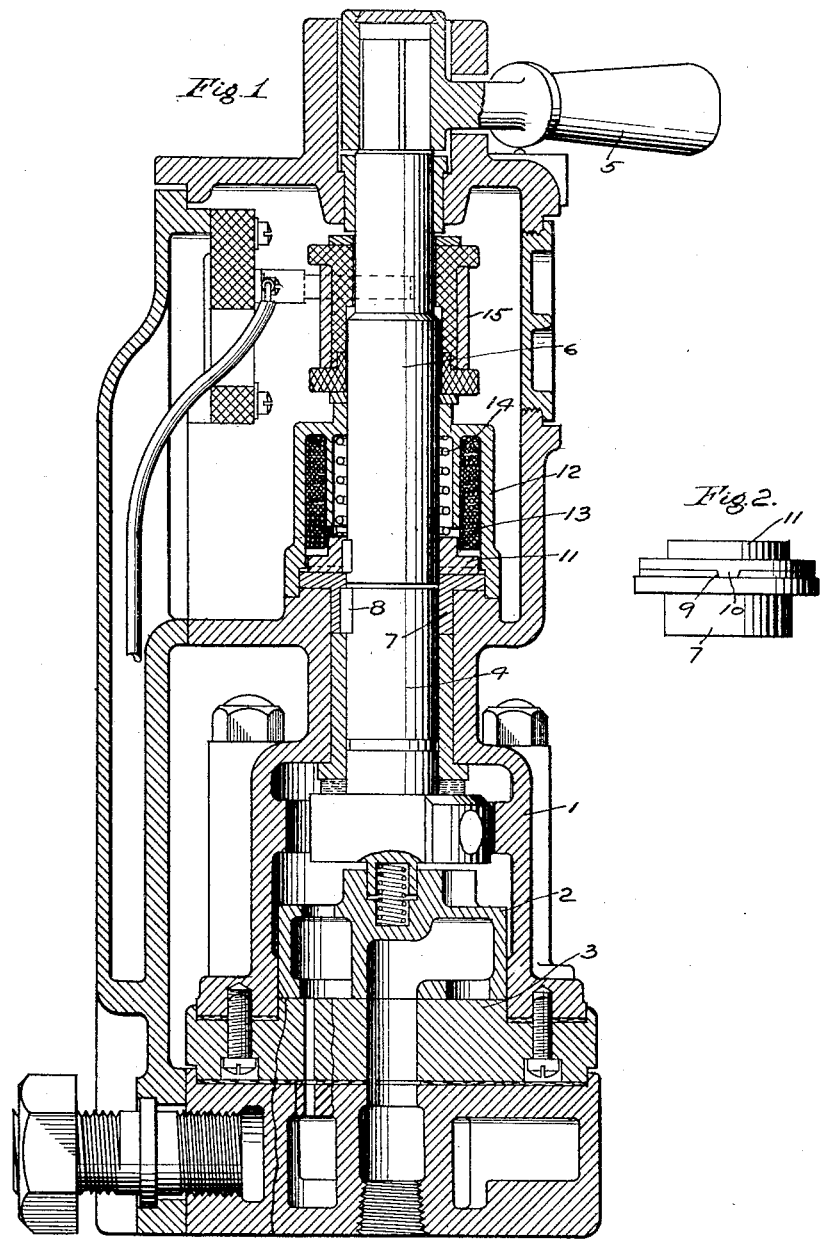
WITNESSES
Wm. M. Cady
J. C. Custer
INVENTOR
Edward H. Dewson
by E. H. Wright  Att'y.

UNITED STATES PATENT OFFICE.

EDWARD H. DEWSON, OF NEW YORK, N. Y., ASSIGNOR TO THE WESTINGHOUSE AIR BRAKE COMPANY, OF PITTSBURGH, PENNSYLVANIA, A CORPORATION OF PENNSYLVANIA.

ELECTROPNEUMATIC BRAKE-VALVE.

1,108,149.   Specification of Letters Patent.   Patented Aug. 25, 1914.

Application filed October 9, 1908. Serial No. 456,958.

*To all whom it may concern:*

Be it known that I, EDWARD H. DEWSON, a citizen of the United States, residing at New York, in the county of New York and State of New York, have invented new and useful Improvements in Electropneumatic Brake-Valves, of which the following is a specification.

This invention relates to electro-pneumatic brakes and has for its main object to provide a brake valve device adapted to control both the electrical and the pneumatic operation of the brakes and wherein means are provided so that the rotary valve is moved on its seat only in the pneumatic operation, said valve remaining inactive during the electrical control of the brakes.

In the accompanying drawing; Figure 1 is a central vertical section of an electropneumatic brake device embodying my improvements; and Fig. 2 a detail side view of the clutch mechanism employed for connecting the rotary valve with the brake valve handle.

According to Fig. 1 the brake valve construction comprises a casing 1 containing rotary valve 2 mounted on the valve seat 3 for controlling the brakes pneumatically and provided with valve stem 4. The brake valve handle 5 is adapted to be mounted on a stub shaft 6 in line with but separated from the valve stem 4. At an intermediate point on the stub shaft 6 is mounted an electric contact ring 15 for engagement with fixed contact fingers in certain positions so as to control the electric operation of the brakes in the usual manner.

The outer end of the valve stem 4 is provided with a disk 7 of non-magnetic material suitably secured to the valve stem, as by a key 8, and having on its upper face a recess 9 within which a tongue 10 of a similar disk 11 of soft iron is adapted to engage, the disk 11 being keyed to the end of the stub shaft 6 to rotate therewith, but adapted to reciprocate on the key, so as to permit engagement and disengagement of the tongue and recess.

Above the disk 11 a soft iron magnet casing 12 surrounds the shaft 6 and contains a magnet coil 13 which may be connected in series in the brake circuit. A spring 14 is also contained in the magnet casing 12 and is adapted to bear against the disk 11.

In operation, when the brake valve handle is manipulated to control the fluid pressure operation of the brakes the electric circuit is open and so the magnet coil 13 is deënergized and the spring 14 maintains the tongue 10 within the recess 9. Upon movement of the brake valve handle to electric application position where current is flowing through the brake controlling circuit, the magnet coil 13 is energized and the disk 11 is attracted to the pole of the magnet coil so that the tongue 10 lifts out of the recess 9. Further movement of the brake valve handle to electric lap and electric release positions will consequently cause no movement of the rotary valve whether the magnet coil is energized or not as the tongue can only engage in the recess in the one position at which the disengagement took place, as will be evident. Upon returning the brake valve handle to electric application position, the magnet coil is again energized, but as the coil is deënergized in moving toward the pneumatic position, the disk 11 is moved down by spring 14 so that the tongue 10 engages the recess 9, and further movement of the brake valve handle carries the rotary valve to its different pneumatic positions, as will be evident.

By means of my improvements wear of the rotary valve and seat is considerably reduced as the valve is not moved on its seat during the electrical operation of the brakes.

Having now described my invention, what I claim as new and desire to secure by Letters Patent, is:—

1. In a brake valve for controlling fluid pressure brakes, the combination with a valve having ports for supplying and releasing air to and from the brake system and an operating handle for said valve, of a valve stem composed of two parts in axial alinement and arranged between said handle and valve and means controlled by the handle for operatively connecting the parts of the valve stem upon movement of the handle in the same plane of rotation to effect the movement of the valve by the handle.

2. A brake valve device comprising a rotary valve for controlling variations in pressure in the brake system, an operating handle therefor, a two part valve stem with the parts in axial alinement, and means adapted to disconnect the two parts of the valve stem at one position in the movement of the handle.

3. In an electro-pneumatic brake valve device, valve means for controlling the brakes pneumatically, electric contact means for controlling the brakes electrically, a manually operated handle for actuating the valve means and the electric contact means, and electric means for operatively disconnecting the handle from said valve means upon movement of the handle to control the brakes electrically.

4. In an electro-pneumatic brake valve device, valve means for controlling the brakes pneumatically, electric contact means for controlling the brakes electrically, a manually operated handle for actuating the valve means and the electric contact means, and means operating upon flow of current in the brake controlling electric circuit for operatively disconnecting said valve means from the handle.

5. In an electro-pneumatic brake valve device, valve means for controlling the brakes pneumatically, electric contact means for controlling the brakes electrically, a manually operated handle for actuating the valve means and the electric contact means, a clutch device for operatively connecting the handle with said valve means, and means for opening said clutch upon movement of the handle to an electric brake control position, to thereby operate the electric contact means without actuating said valve means.

6. In an electro-pneumatic brake valve device, valve means for controlling the brakes pneumatically, electric contact means for controlling the brakes electrically, a manually operated handle for actuating the valve means and the electric contact means, a clutch device for operatively connecting the handle with said valve means, and electromagnetic means for actuating said clutch device to disconnect the handle from said valve means upon movement of the handle to an electric operating position.

7. In an electro-pneumatic brake valve device, valve means for controlling the brakes pneumatically, electric contact means for controlling the brakes electrically, a manually operated handle for actuating the valve means and the electric contact means, a clutch device for operatively connecting the handle and said valve means, a spring tending to maintain the clutch locked, and an electro-magnet operated by flow of current in the brake control circuit for opening said clutch to permit the movement of the handle independently of said valve means.

In testimony whereof I have hereunto set my hand.

EDWARD H. DEWSON.

Witnesses:
  GEO. E. BAKER,
  W. KAYLOR.

---

Copies of this patent may be obtained for five cents each, by addressing the "Commissioner of Patents, Washington, D. C."